United States Patent
Sawada

(10) Patent No.: US 10,038,825 B2
(45) Date of Patent: Jul. 31, 2018

(54) IMAGE PROCESS APPARATUS FOR CORRECTING A DOCUMENT BASED ON CORRECTION PARAMETER OF ANOTHER DOCUMENT AND COMPUTER PROGRAM THEREFOR

(71) Applicant: BROTHER KOGYO KABUSHIKI KAISHA, Nagoya-shi, Aichi-ken (JP)

(72) Inventor: Kazuhide Sawada, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 30 days.

(21) Appl. No.: 15/062,389

(22) Filed: Mar. 7, 2016

(65) Prior Publication Data

US 2016/0286094 A1    Sep. 29, 2016

(30) Foreign Application Priority Data

Mar. 27, 2015 (JP) .................. 2015/065735

(51) Int. Cl.
*H04N 1/60* (2006.01)
*H04N 1/00* (2006.01)

(52) U.S. Cl.
CPC ....... *H04N 1/6052* (2013.01); *H04N 1/00347* (2013.01); *H04N 1/00801* (2013.01);
(Continued)

(58) Field of Classification Search
CPC ............. H04N 1/6052; H04N 1/00347; H04N 1/00801; H04N 1/6008
(Continued)

(56) References Cited

U.S. PATENT DOCUMENTS 5,909,506 A * 6/1999 Goto ................. H04N 1/60
382/162
2002/0031256 A1 * 3/2002 Hiramatsu ........... H04N 1/6005
382/162
(Continued)

FOREIGN PATENT DOCUMENTS

JP    H11-031052 A    2/1999
JP    2005-151089 A    6/2005
(Continued)

OTHER PUBLICATIONS

U.S. Appl. No. 15/062,397, filed Mar. 7, 2016.
(Continued)

*Primary Examiner* — Jamares Q Washington
(74) *Attorney, Agent, or Firm* — Scully, Scott, Murphy & Presser, P.C.

(57) ABSTRACT

An image processing apparatus includes: a controller performs: acquiring first original image data generated by optically reading a first document; acquiring first corrected image data generated by executing first correction processing; calculating a feature amount indicative of a difference between the first original image data and the first corrected image data; determining a correction parameter indicative of the specific color by using the calculated feature amount; acquiring second original image data generated by optically reading a second document different from the first document, and generating second corrected image data by executing second correction processing for the second original image data, wherein the second correction processing is processing of changing the pixel value indicative of the specific color specified by using the determined correction parameter into the pixel value indicative of the color different from the specific color.

11 Claims, 10 Drawing Sheets

(52) U.S. Cl.
CPC ........... *H04N 1/603* (2013.01); *H04N 1/6008* (2013.01); *H04N 1/6033* (2013.01)

(58) Field of Classification Search
USPC .................... 358/1.9, 518, 522, 523; 382/167
See application file for complete search history.

(56) References Cited

U.S. PATENT DOCUMENTS

| | | | |
|---|---|---|---|
| 2005/0212814 A1* | 9/2005 | Kubo | H04N 1/6013 345/614 |
| 2007/0041027 A1* | 2/2007 | Malik | H04N 1/58 358/1.9 |
| 2009/0324074 A1 | 12/2009 | Dembo | |
| 2014/0099026 A1* | 4/2014 | Krishnaswamy | H04N 1/6027 382/167 |
| 2014/0348427 A1* | 11/2014 | Brendel | G06T 5/007 382/167 |
| 2015/0326752 A1 | 11/2015 | Hayasaki | |

FOREIGN PATENT DOCUMENTS

| | | |
|---|---|---|
| JP | 2006-339874 A | 12/2006 |
| JP | 2011-188484 A | 9/2011 |
| JP | 2013-142955 A | 7/2013 |
| JP | 2013-196131 A | 9/2013 |

OTHER PUBLICATIONS

Official Action dated May 22, 2017 in a related application, namely, U.S. Appl. No. 15/062,397, filed Mar. 7, 2016.
Official Action dated Jan. 25, 2018 received in U.S. Appl. No. 15/842,299.
United States Notice of Allowance dated May 22, 2018 received in related U.S. Appl. No. 15/842,299.

\* cited by examiner

FIRST ORIGINAL IMAGE

FIRST CORRECTED IMAGE

FIRST ILLUSTRATIVE EMBODIMENT

SECOND ORIGINAL IMAGE

SECOND CORRECTED IMAGE

SECOND ILLUSTRATIVE EMBODIMENT

SECOND ILLUSTRATIVE EMBODIMENT

IMAGE PROCESS APPARATUS FOR CORRECTING A DOCUMENT BASED ON CORRECTION PARAMETER OF ANOTHER DOCUMENT AND COMPUTER PROGRAM THEREFOR

CROSS-REFERENCE TO RELATED APPLICATION

This application claims priority from Japanese Patent Application No. 2015-065735 filed on Mar. 27, 2015, the entire subject matter of which is incorporated herein by reference.

TECHNICAL FIELD

The disclosure relates to correction processing for image data generated by optically reading a document.

BACKGROUND

A technology of performing correction processing for image data generated by optically reading a document with a reading apparatus, such as a scanner, has been known. For example, JP-A-2006-339874 discloses a technology of changing a pixel value indicative of a specific color in an image into a pixel value indicative of white. According to this technology, a color palette is displayed on a multifunction device color liquid crystal panel, and an instruction of the specific color is received from a user.

SUMMARY

However, according to the above technology, it cannot be said that it is possible to easily perform the appropriate correction processing. For example, since the user cannot easily select an appropriate specific color all the time, the user may not appropriately select the specific color. In this case, a user's unintended color may be changed by the correction processing.

This disclosure provides a technology capable of easily performing appropriate correction processing, which changes a pixel value indicative of a specific color, for image data generated by optically reading a document.

The disclosed technology can be implemented as following application embodiments.

An image processing apparatus includes: a controller configured to perform: acquiring first original image data generated by optically reading a first document; acquiring first corrected image data generated by executing first correction processing for the first original image data, wherein the first correction processing is processing of changing a pixel value indicative of a specific color into a pixel value indicative of a color different from the specific color; calculating a feature amount indicative of a difference between the first original image data and the first corrected image data by using the first original image data and the first corrected image data; determining a correction parameter indicative of the specific color by using the calculated feature amount; acquiring second original image data generated by optically reading a second document different from the first document, and generating second corrected image data by executing second correction processing for the second original image data, wherein the second correction processing is processing of changing the pixel value indicative of the specific color specified by using the determined correction parameter into the pixel value indicative of the color different from the specific color.

According to the above configuration, the correction parameter relating to the specific color is determined by using the feature amount indicative of the difference between the first original image data and the first corrected image data. The second correction processing is executed for the second original image data by using the determined correction parameter. As a result, it is possible to easily execute the second correction processing, which changes the pixel value indicative of the specific color into the pixel value indicative of the color different from the specific color, for the second original image data. For example, even when there is no user's instruction to designate the specific color, it is possible to execute the second correction processing for the second original image data.

In the meantime, the disclosed technology can be implemented into a variety of forms, for example, a control device of a printing apparatus, a control device of an image reading apparatus, an image processing method, a computer program for implementing functions of the apparatus and method, a recording medium having the computer program recorded therein, and the like.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

A. Illustrative Embodiment

A-1: Configuration of Multifunction Device

Figure 1:
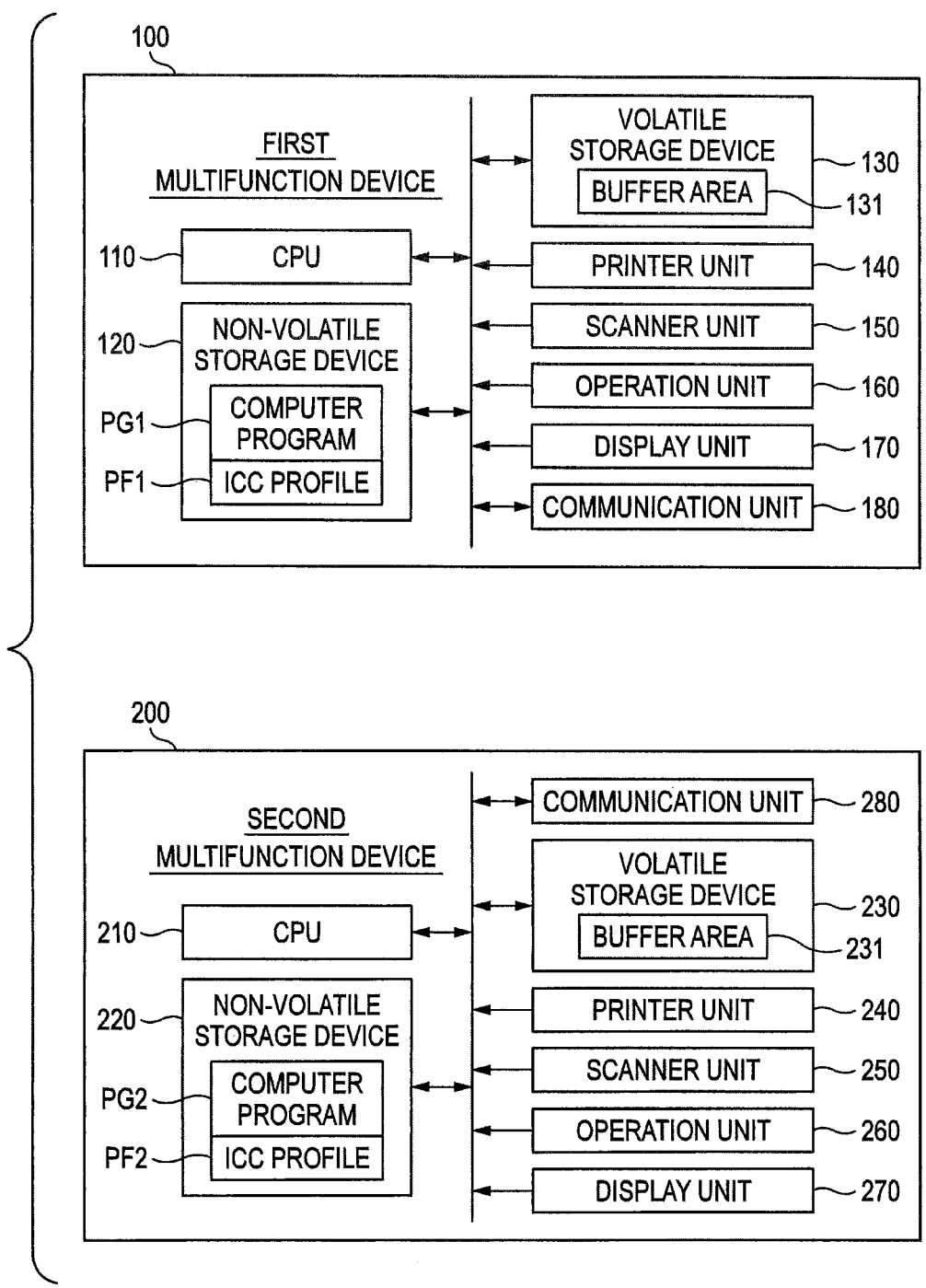
FIG. 1 is a block diagram depicting configurations of a second multifunction device 200, which is an image processing apparatus of an illustrative embodiment, and a first multifunction device 100, which is other image processing apparatus.

Hereinafter, illustrative embodiments of the disclosure will be described with reference to the drawings. FIG. 1 is a block diagram depicting configurations of a second multifunction device 200, which is an image processing apparatus of an illustrative embodiment, and a first multifunction device 100, which is other image processing apparatus.

The second multifunction device 200 includes a CPU 210 serving as a controller of the second multifunction device 200, a non-volatile storage device 220 such as a hard disk drive and an EEPROM, a volatile storage device 230 such as a RAM, a printer unit 240 configured to print an image by a predetermined method (for example, an inkjet method and a laser method), a scanner unit 250, an operation unit 260 such as a touch panel and a button, a display unit 270 such as a liquid crystal panel overlapped with the touch panel, and a communication unit 280 including an interface for performing data communication with an external apparatus such as a user's terminal apparatus and a USB memory (not shown).

The scanner unit 250 is a reading apparatus configured to optically read a document with an image sensor, thereby generating scan data, for example. The scan data is RGB image data, which represents a color of each pixel by an RGB value including a gradation value (for example, 256 gradations of 0 to 255) of three color components of RGB. The RGB value included in the scan data generated by the scanner unit 250 is a color value of a device-dependent color space depending on characteristics of the scanner unit 250, for example, characteristics of a photoelectric conversion device and a color filter included in the image sensor. The RGB value depending on the scanner unit 250 is also referred to as a second type of RGB value. The scan data generated by the scanner unit 250, i.e., the scan data representing a color of each pixel by the second type of RGB value is also referred to as a second type of scan data.

The non-volatile storage device 220 is configured to store therein a computer program PG2 and an ICC profile PF2. The computer program PG2 and the ICC profile PF2 are integrally or separately configured, and for example, are stored in advance in non-volatile storage device 220 upon the manufacturing of the second multifunction device 200. Instead, the computer program PG2 and the ICC profile PF2 may be stored in a CD-ROM, a DVD-ROM and the like, or may be downloaded from a server (not shown) connected to the second multifunction device 200 through a work. The volatile storage device 230 is provided with a buffer area 231 configured to temporarily store therein a variety of intermediate data generated when the CPU 210 performs processing.

The ICC profile PF2 is a color conversion profile prepared in conformity to the standards published by the International Color Consortium (ICC). The ICC profile PF2 is a color conversion profile in which the second type of RGB value depending on the scanner unit 250 and a color value of a device-independent color space are associated with each other. In this illustrative embodiment, as the color value of a device-independent color space, a color value (also referred to as Lab value) of a CIELAB color space (L*a*b* color space) is used. By referring to the ICC profile PF2, it is possible to convert the second type of RGB value, which is included in the second type of scan data generated by the scanner unit 250, into the Lab value. Also, by referring to the ICC profile PF2, it is possible to convert the Lab value into the second type of RGB value.

The CPU 210 is configured to execute the computer program PG2, thereby implementing a function of entirely controlling the second multifunction device 200 and a function of executing image processing including second color drop processing for the second type of scan data.

The first multifunction device 100 is a multifunction device having a different type from the second multifunction device 200. In this illustrative embodiment, a manufacturer of the first multifunction device 100 and a manufacturer of the second multifunction device 200 are also different.

Similarly to the second multifunction device 200, the first multifunction device 100 includes a CPU 110, a non-volatile storage device 120, a volatile storage device 130, a printer unit 140, a scanner unit 150, an operation unit 160, a display unit 170 and a communication unit 180. In the non-volatile storage device 120, a computer program PG1 and an ICC profile PF1 are stored.

The scanner unit 150 is a reading apparatus configured to optically read a document, thereby generating scan data. The characteristics of the scanner unit 150, for example, characteristics of the photoelectric conversion device and the color filter included in the image sensor are different from the characteristics of the scanner unit 250. The scan data generated by the scanner unit 150 is the same RGB image data as the second type of scan data generated by the scanner unit 250. However, the RGB value included in the scan data generated by the scanner unit 150 is a color value of a device-dependent color space depending on the characteristics of the scanner unit 150. The RGB value depending on the scanner unit 150 is also referred to as a first type of RGB value. The scan data generated by the scanner unit 150, i.e., the scan data representing a color of each pixel by the first type of RGB value is also referred to as a first type of scan data.

The ICC profile PF1 is a color conversion profile in which the first type of RGB value depending on the scanner unit 150 and a color value of a device-independent color space are associated with each other. In this illustrative embodiment, as the color value of a device-independent color space, the Lab value is used, like the ICC profile PF2. By referring to the ICC profile PF1, it is possible to convert the first type of RGB value, which is included in the first type of scan data generated by the scanner unit 150, into the Lab value. Also, by referring to the ICC profile PF1, it is possible to convert the Lab value into the first type of RGB value.

A-2: Operations

In this illustrative embodiment, a case is assumed in which a user of the first multifunction device 100 switches the multifunction device being used from the first multifunction device 100 to the second multifunction device 200. Currently, the user manages ledger sheets such as a bill, a receipt and the like, by using the scanner unit 150 of the first multifunction device 100. Specifically, based on an instruction of the user, the CPU 110 of the first multifunction device 100 enables the scanner unit 150 to read the ledger sheets as documents, thereby generating scan data. Then, the CPU 110 executes color drop processing (which will be described later) for the scan data to generate corrected scan data representing an image, in which an object such as a frame border except for characters is removed from a scan image representing the ledger sheet. The user executes character identification processing for the corrected scan data by using a terminal apparatus such as a PC, for example, thereby extracting character data. The user manages the character data, which represents contents of the ledger sheet, by using the terminal apparatus.

The second multifunction device 200 can execute parameter registration processing for relieving a user's burden on the setting of the second multifunction device 200. The parameter registration processing supports the user performing of setting on the second multifunction device 200 so that the same processing as the color drop processing, which is executed by the CPU 110 of the first multifunction device 100, can be executed at the second multifunction device 200. The color drop processing that is executed by the CPU 110 of the first multifunction device 100 is also referred to as first color drop processing, and the color drop processing that is executed by the CPU 210 of the second multifunction device 200 is also referred to as second color drop processing.

A-2. Preparation of Image Data for Analysis and the Like

Before executing the parameter registration processing by the second multifunction device 200, the user prepares, as image data for analysis, first original image data and first corrected image data, and also prepares the ICC profile PF1.

Figure 2A:
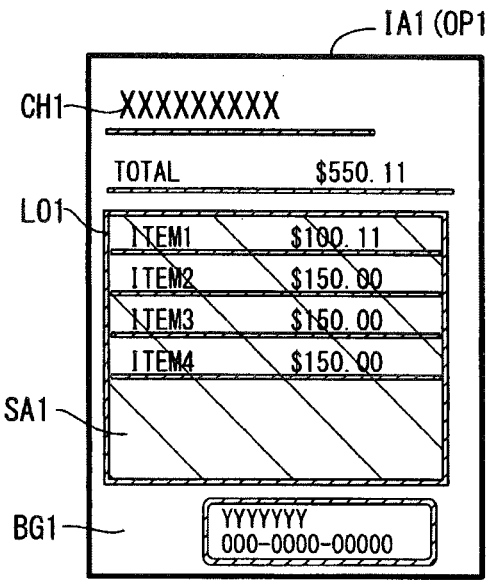
FIGS. 2A and 2B illustrate examples of a first original image and a first corrected image.
Figure 2B:
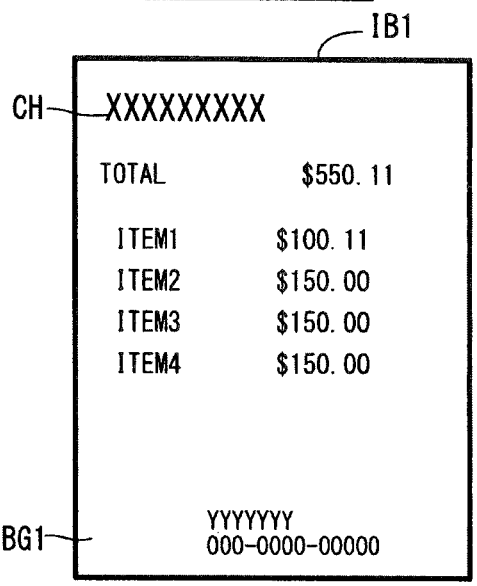

FIGS. 2A and 2B illustrate examples of the first original image and the first corrected image. A first original image IA1 of FIG. 2A is an image represented by the first original image data. The first original image data is generated by optically reading a document OP1 with the scanner unit 150 of the first multifunction device 100. Therefore, the first original image data is the first type of scan data including the first type of RGB value for each pixel. FIG. 2A illustrates not only the first original image IA1 but also the document OP1.

The first original image IA1 and the document OP1 represent a ledger sheet, for example, and include a plurality of characters CH1, an object LO1 such as a frame border and an underline except for the characters, an area SA1 of a solid color having a specific color except for white, and a white background BG1. The object LO1 except for the characters and the area SA1 of the solid color have colors different from the characters CH1. For example, the characters CH1 are black, the object LO1 except for the characters and the area SA1 of the solid color are red or blue.

The CPU 110 of the first multifunction device 100 executes the first color drop processing for the first original image data, and the first corrected image data is generated. The first color drop processing is processing of changing a pixel value indicative of a specific color to a pixel value indicative of a color different from the specific color. For example, the first color drop processing that is executed for the first original image data of this illustrative embodiment is processing of respectively changing the first type of RGB values having a specific color of the object LO1 except for the characters and a specific color of the area SA1 of the solid coating, into the first type of RGB value indicative of white, which is a color of the background BG1. As a result, the first corrected image data representing a first corrected image IB1, in which the object LO1 except for the characters and the area SA1 of the solid color are removed from the first original image IA1, is generated by the first color drop processing. The first corrected image IB1 of FIG. 2B includes the plurality of characters CH1 and does not include the object LO1 except for the characters and the area SA1 of the solid coating.

The first color drop processing is executed at the first multifunction device 100, based on a correction parameter set by the user. The correction parameter is information indicative of one or more specific colors to be changed, i.e., one or more specific colors to be removed in a specific type of a ledger sheet including the document OP1, for example, a ledger sheet to be issued from a specific business partner. The first color drop processing is executed for the first original image data. The object LO1 except for the characters and the area SA1 of the solid color are removed from the first original image IA1, in order to improve character identification precision upon execution of character identification processing.

For example, the user stores the first original image data and the first corrected image data, which was previously generated by the first multifunction device 100, into a removable memory such as the USB memory, from the non-volatile storage device 120 of the first multifunction device 100 or the terminal. Also, the user acquires the ICC profile PF1 from the non-volatile storage device 120 of the first multifunction device 100 or a manufacturer's server of the first multifunction device 100 and stores the same in the removable memory. When an image file having at least one image data of the first original image data and the first corrected image data is stored in a file format having a format capable of storing additive information, the ICC profile PF1 may be stored in the image file, as the additive information. The format capable of storing the additive information is a well-known format such as Exif (registered trademark, an abbreviation of Exchangeable image file format), for example.

A-3. Parameter Registration Processing

In the parameter registration processing, the first original image data and the first corrected image data are analyzed to generate the correction parameter for executing the same second color drop processing as the first color drop processing, which is executed at the first multifunction device 100, at the second multifunction device 200. The parameter registration processing is executed by the CPU 210 of the second multifunction device 200 when an execution instruction from the user is input through the operation unit 260, for example. For example, the user inputs an execution instruction at a state where the removable memory, in which the first original image data, the first corrected image data and the ICC profile PF1 are stored, is connected to the communication unit 280 of the second multifunction device 200.

Figure 3:
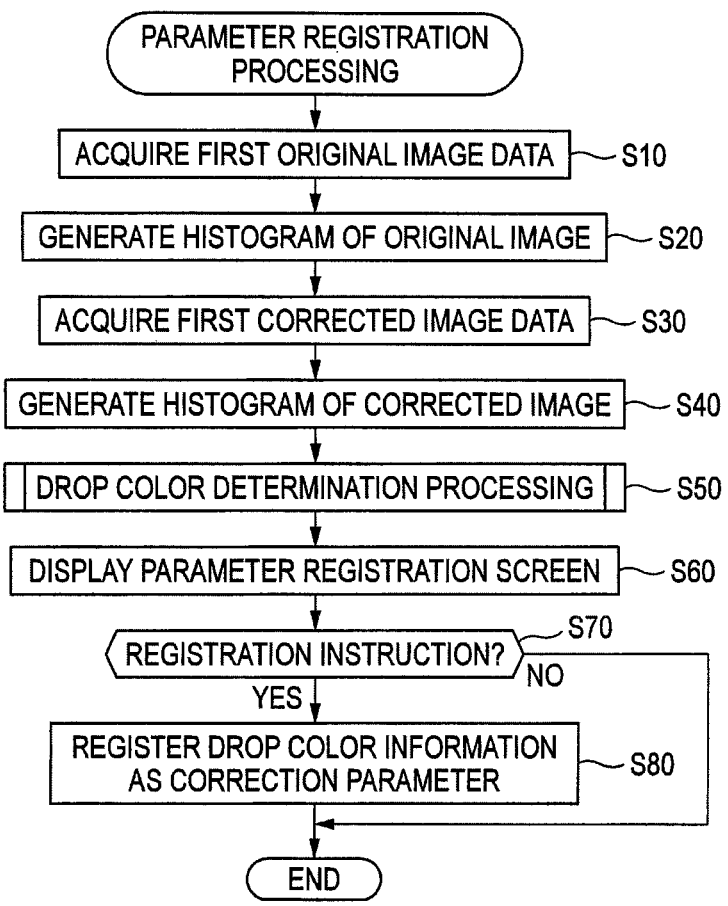
FIG. 3 is a flowchart of parameter registration processing.

FIG. 3 is a flowchart of the parameter registration processing. In S10, the CPU 210 acquires the first original image data from the removable memory connected to the communication unit 280 and stores the same in the buffer area 231.

In S20, the CPU 210 generates a histogram, which is indicative of a distribution of colors of the first original image IA1, by using the first original image data. Specifically, the CPU 210 classifies the plurality of pixels in the first original image IA1 into a plurality of classes based on the values of the pixels, i.e., the RGB values. In this illustrative embodiment, the RGB color space CSP is divided into a plurality of spaces, so that a plurality of blocks Bk is set in the RGB color space CSP. The plurality of blocks Bk is used as the plurality of classes.

Figure 4:
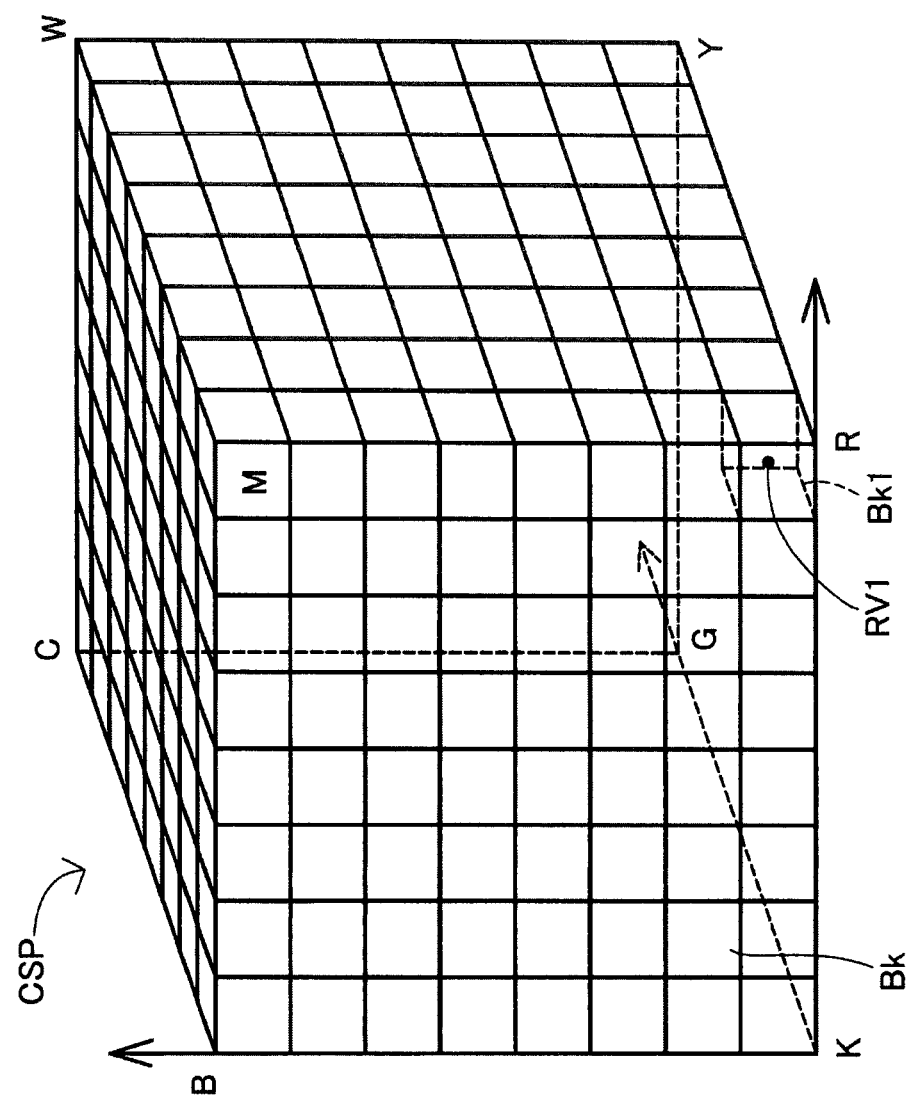
FIG. 4 illustrates an RGB color space CSP and a plurality of blocks Bk.

FIG. 4 illustrates the RGB color space CSP and the plurality of blocks Bk. The RGB color space CSP is a cubic space. In FIG. 4, a K point (black point), an R point (red point), a G point (green point) and a B point (blue point) indicate points of which the RGB values are (0, 0, 0), (255, 0, 0), (0, 255, 0) and (0, 0, 255), respectively. Likewise, a C point (cyan point), an M point (magenta point), a Y point (yellow point) and a W point (white point) indicate points of which the scanner RGB values are (0, 255, 255), (255, 0, 255), (255, 255, 0) and (255, 255, 255). In this illustrative embodiment, the RGB color space CSP is N-divided (N: an integer of 2 or greater) in an R axis direction, a G axis direction, and a B axis direction, respectively, so that the cubic blocks Bk of $N^3$ are set in the RGB color space CSP. FIG. 4 illustrates an example where N is 8, for simple illustration. However, for example, in this illustrative embodiment, N is 16, so that 4096 blocks Bk are set.

The generated histogram is data indicative of the number of pixels (hereinafter, referred to as the distribution number of pixels of the block Bk) having the RGB value in the block Bk, with respect to each of the plurality of blocks Bk.

In S30, the CPU 210 acquires the first corrected image data from the removable memory connected to the communication unit 280 and stores the same in the buffer area 231.

In S40, the CPU 210 generates a histogram, which is indicative of a distribution of colors of the first corrected image IB1, by using the first corrected image data. Specifically, the CPU 210 classifies the plurality of pixels in the first corrected image IB1 into a plurality of classes based on the values of the pixels, i.e., the RGB values. As the plurality of classes, the plurality of blocks Bk that is set in the RGB color space CSP is used (FIG. 4), like the histogram of the first original image IA1.

In S50, the CPU 210 executes drop color determination processing. The drop color determination processing is processing of determining a specific color (drop color) to be changed in the second color drop processing.

Figure 5:
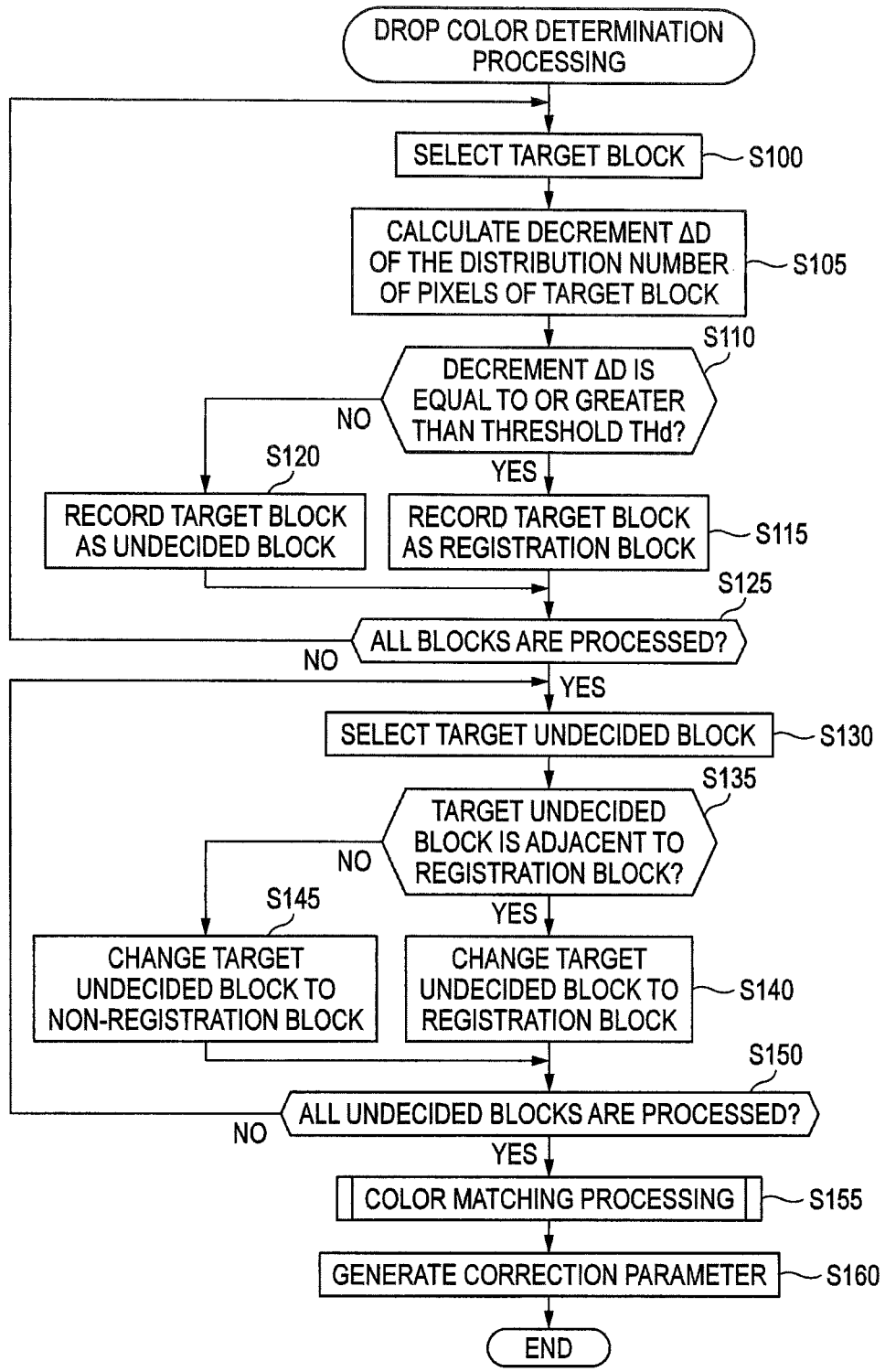
FIG. 5 is a flowchart of drop color determination processing.

FIG. 5 is a flowchart of the drop color determination processing. In S100, the CPU 210 selects one target block from the plurality of blocks Bk set in the RGB color space CSP.

In S105, the CPU 210 calculates a decrement ΔD of the distribution number of pixels of the target block. The distribution number of pixels of the first corrected image IB1, i.e., the number of pixels of the first corrected image IB1 having a color value in the target block is defined as Db. Also, the distribution number of pixels of the first original image IA1, i.e., the number of pixels of the first original image IA1 having a color value in the target block is defined as Da. The decrement ΔD is a reduced number of the distribution number of pixels Db of the first corrected image IB1, as compared to the distribution number of pixels Da of the first original image IA1, i.e., a value obtained by subtracting the distribution number of pixels Db from the distribution number of pixels Da (ΔD=Da−Db).

In S110, the CPU 210 determines whether the calculated decrement ΔD is equal to or greater than a threshold THd. The threshold THd is, for example, a fixed value determined based on a total number of pixels PNt in the first original image IA1 and the number BN of blocks Bk set in the RGB color space CSP (for example, THd=(PNt/BN)×K1). Instead, the threshold THd may be dynamically determined for each target block, based on the distribution number of pixels Da of the first original image IA1 relating to the target block (for example, THd=Da×K2). Here, K1 and K2 are coefficients that are experimentally determined.

When the decrement ΔD is equal to or greater than the threshold THd (S110: YES), the CPU 210 records the target block, as a registration block in S115. In a case where the decrement ΔD is relatively large, there is a high possibility that the pixel value having the color in the target block has been changed to the pixel value having the other color, i.e., the color except for the target block by the first color drop processing. Accordingly, in this case, the target block is recorded in the buffer area 231, as a registration block indicative of a color that is changed in the second color drop processing.

When the decrement ΔD is smaller than the threshold THd (S110: NO), the CPU 210 records the target block as an undecided block in S120. In a case where the decrement ΔD is relatively small, there is a low possibility that the pixel value having the color in the target block has been changed to the other color by the first color drop processing. For this reason, in this case, the target block is recorded as an undecided block in the buffer area 231 without being recorded as a registration block.

In S125, the CPU 210 determines whether all the blocks Bk in the RGB color space CSP have been processed as the target block. When there is a non-processed block Bk (step S125: NO), the CPU 210 returns to step S100 and selects the non-processed block Bk as a next target block. When all the blocks Bk have been processed (step S125: YES), the CPU 210 proceeds to S130. At this point, all the blocks Bk are classified to any of the registration block and the undecided block.

In S130, the CPU 210 selects one target undecided block from the plurality of undecided blocks. In S135, the CPU 210 determines whether the target undecided block is adjacent to the registration block.

Figure 6:
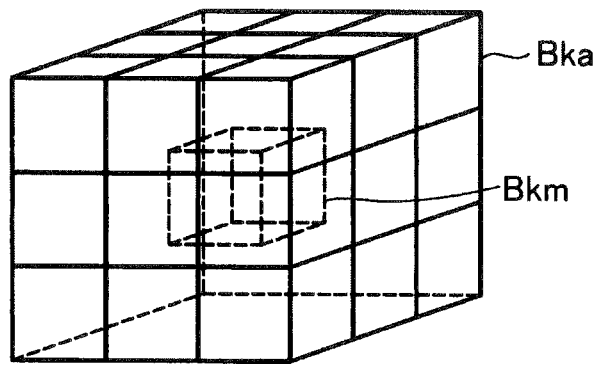
FIG. 6 illustrates a target undecided block and adjacent blocks adjacent to the target undecided block.

FIG. 6 illustrates a target undecided block and adjacent blocks adjacent to the target undecided block. As shown in FIG. 6, the adjacent blocks BKa of the one undecided block Bkm are 26 blocks on which at least one of six surfaces, 12 sides and 8 apexes of the cubic undecided block Bkm abuts. Instead, the adjacent blocks BKa of the one undecided block Bkm may be six blocks that abut on the six surfaces of the undecided block Bkm, respectively. When the 26 adjacent blocks of the target undecided block include at least one registration block, it is determined that the target undecided block is adjacent to the registration block.

When the target undecided block is adjacent to the registration block (S135: YES), the CPU 210 changes the target undecided block to the registration block in S140. When the target undecided block is not adjacent to the registration block (S135: NO), the CPU 210 changes the target undecided block to a non-registration block in S145. That is, the target undecided block is newly recorded as one of the registration block and the non-registration block.

In S150, the CPU 210 determines whether all the undecided blocks have been processed as the target undecided block. When there is a non-processed undecided block (step S150: NO), the CPU 210 returns to step S130 and selects the non-processed undecided block as a new target undecided block. When all the undecided blocks have been processed (step S150: YES), the CPU 210 proceeds to S155. At this point of time, the block Bk of which the decrement ΔD is equal to or greater than the threshold THd and the blocks adjacent to the block Bk are classified to the registration blocks, and the blocks except for the registration blocks are classified to the non-registration blocks.

In S155, color matching processing is executed. The color matching processing is processing of modify a specific color, which is to be changed in the second color drop processing, taking into consideration the difference between the characteristics of the scanner unit 150 of the first multifunction device 100 and the characteristics of the scanner unit 250 of the second multifunction device 200. Specifically, the registration block defining a range of the specific color, which is to be changed in the second color drop processing, is modified by using the ICC profiles PF1, PF2.

Figure 7:
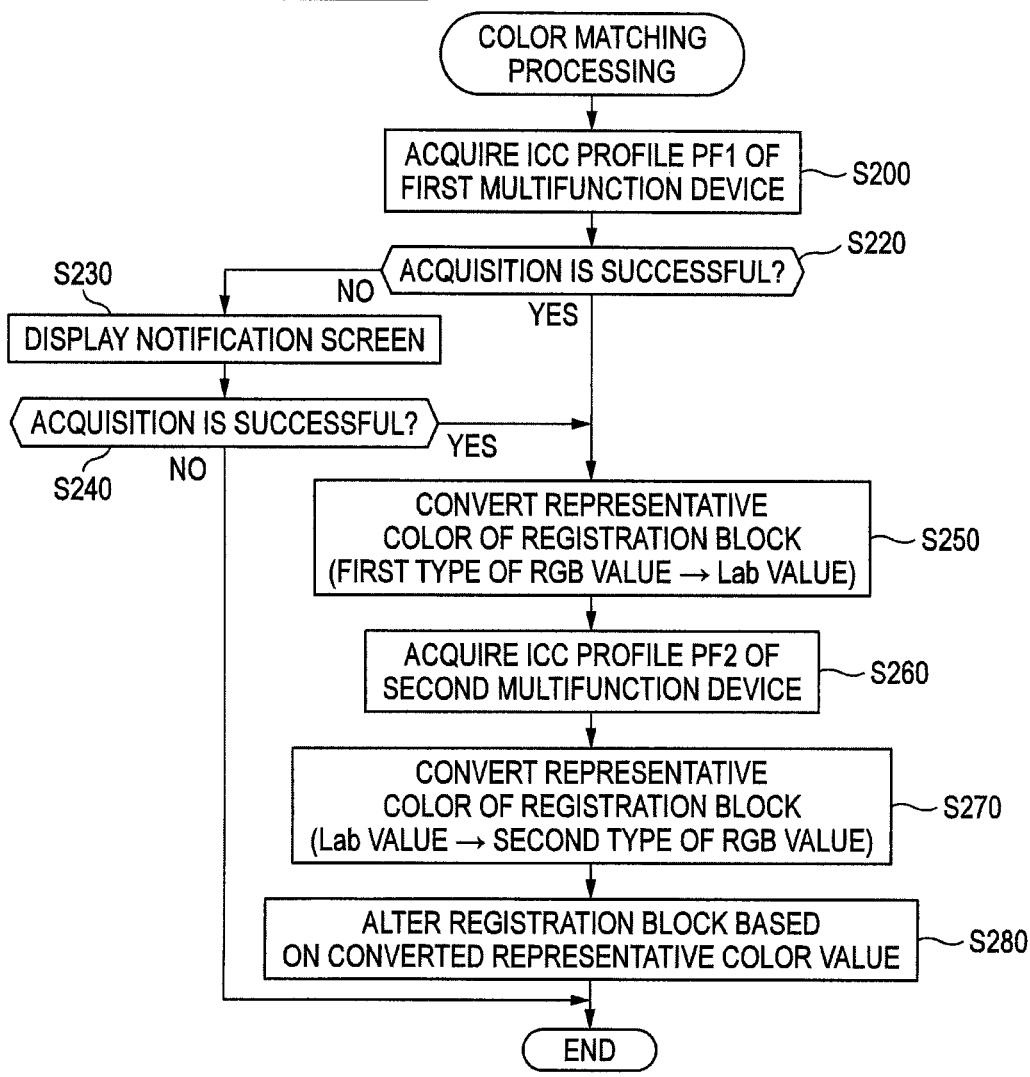
FIG. 7 is a flowchart of color matching processing according to a first illustrative embodiment.

FIG. 7 is a flowchart of the color matching processing. In S200, the CPU 210 acquires the ICC profile PF1 of the first multifunction device 100 from the removable memory connected to the communication unit 280 and stores the same in the buffer area 231. Alternatively, the CPU 210 may acquire the ICC profile PF1 stored, as the additive information, in at least one of the image file of the first original image data and the image file of the first corrected image data. When the ICC profile PF1 is neither stored in the removable memory nor the image file, the CPU 210 fails to acquire the ICC profile PF1.

In S220, the CPU 210 determines whether acquisition of the ICC profile PF1 is successful. When acquisition of the ICC profile PH is successful (S220: YES), the CPU 210 proceeds to S250. When acquisition of the ICC profile PF1 is fails (S220: NO), the CPU 210 displays a notification screen WI1, which is a UI screen for notifying that the ICC profile PF1 cannot be acquired, on the display unit 170, in S230.

Figure 8:
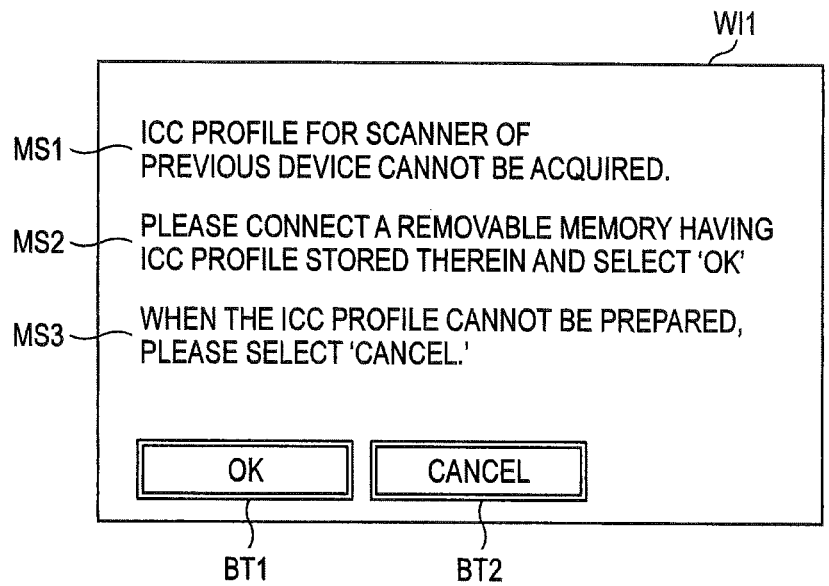
FIG. 8 illustrates an example of a notification screen WI1.

FIG. 8 illustrates an example of the notification screen WI1. The notification screen WI1 includes messages MS1 to MS3 and buttons BT1, BT2. The message MS1 is a message for notifying that the ICC profile PF1 cannot be acquired. The message MS2 is a message for urging the user to input the ICC profile PF1 into the second multifunction device 200. The message MS3 is a message for urging the user to input a notice indicating that the ICC profile PF1 cannot be input into the second multifunction device 200.

When the ICC profile PH can be acquired from the first multifunction device 100 and the like, the user connects the removable memory having the acquired ICC profile PF1 stored therein to the communication unit 280, and then presses the button BT1. When the ICC profile PF1 cannot be acquired, the user presses the button BT2. When the button BT1 is pressed, the CPU 210 acquires the ICC profile PF1 from the removable memory.

In S240, the CPU 210 determines whether acquisition of the ICC profile PF1 is successful based on the user's operation on the notification screen WI. When the button BT1 of the notification screen WI is pressed and the ICC profile PF1 is thus acquired, it is determined that the acquisition of the ICC profile PF1 is successful. When the button BT2 of the notification screen WI is pressed, it is determined that the acquisition of the ICC profile PH fails. When the ICC profile PF1 is acquired (S240: YES), the CPU 210 proceeds to S250. When the ICC profile PF1 is not acquired (S240: NO), the CPU 210 skips over S250 to S280 and terminates the color matching processing.

In S250, the CPU 210 converts the representative color value of each of the plurality of registration blocks recorded in the processing of S100 to S150 of FIG. 5 to the Lab value by using the ICC profile PF1. Since the RGB color space CSP is a color space of the color values of the first original image IA1 and the first corrected image represented by the first type of scan data, the representative color value of each registration block is the first type of RGB value. Therefore, in S250, the representative color value of each registration block is converted from the first type of RGB value into the Lab value. In this illustrative embodiment, the representative color value of the registration block is an RGB value positioned at a center of the registration block in the RGB color space CSP. In FIG. 4, a representative color value RV of the block Bk1 is shown in the block Bk.

In S260, the CPU 210 acquires the ICC profile PF2 of the second multifunction device 200 from the non-volatile storage device 220 and stores the same in the buffer area 231. In S270, the CPU 210 converts the representative color value of each of the plurality of registration blocks, which was converted into the Lab value in S250, from the Lab value into the second type of RGB value. The representative color value converted in step S270 is also referred to as the converted representative color value.

In S280, the CPU 210 modifies the registration block based on the converted representative color value and terminates the color matching processing. Specifically, the CPU 210 determines, as the registration block, the block Bk, which includes at least one or more of the converted representative color values, of the plurality of blocks Bk set in the RGB color space CSP. Then, the CPU 210 determines, as the non-registration block, the block Bk, which does include not any one of the converted representative color values, of the plurality of blocks Bk.

When the color matching processing of FIG. 7 is terminated, the CPU 210 generates the correction parameter in S160 of FIG. 5 and terminates the drop color determination processing. Specifically, the CPU 210 generates the information, which indicates the one or more registration blocks determines in S280 of FIG. 5, as the correction parameter indicative of the specific color (drop color) to be changed in the second color drop processing.

When the drop color determination processing of FIG. 5 is terminated, in S60 of FIG. 3, the CPU 210 displays a parameter display screen WI2, which is a UI screen for displaying a range of the values of the pixels specified by using the correction parameter of the second color drop processing to the user, on the display unit 270.

Figure 9:
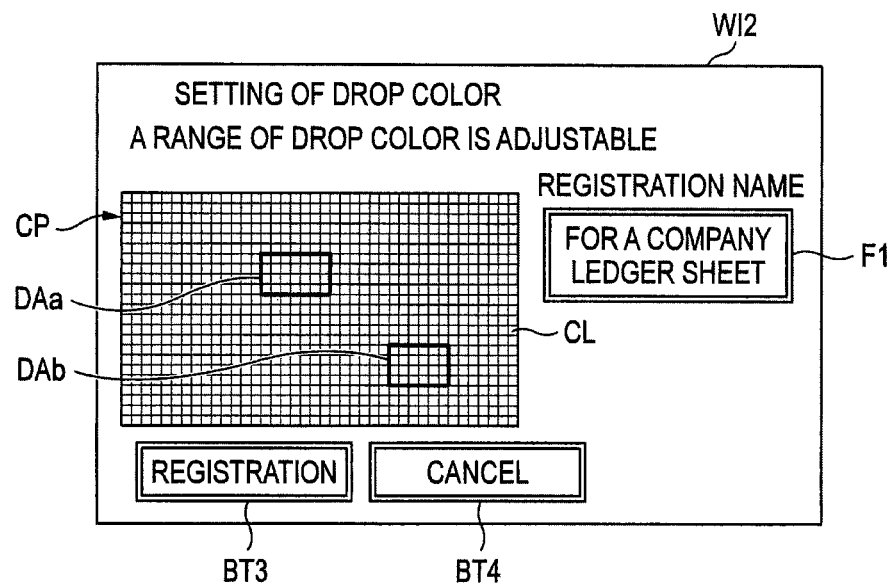
FIG. 9 illustrates an example of a parameter display screen WI2.

FIG. 9 illustrates an example of the parameter display screen WI2. The parameter display screen WI2 includes a color palette CP, in which the RGB color space CSP is represented on a plane, buttons BT3, BT4, and a field F1 for inputting a registration name of the correction parameter. In the color palette CP, a plurality of cells CL corresponding to the plurality of blocks Bk set in the RGB color space CSP is arranged in a grid pattern. Each cell CL has a color indicated by the representative color value of the corresponding block Bk. In the color palette CP, frames DAa, DAb indicative of ranges of drop colors are arranged. Specifically, the frames DAa, DAb indicate one or more cells CL corresponding to the one or more registration blocks determined in S280 of FIG. 5. In the example of FIG. 9A, the frame DAa is a range indicative of the color of the object LO1 except for the characters of the first original image IA1 shown in FIG. 2A, and the frame DAb is a range indicative of the color of the area SA1 of the solid coating, for example.

The user can add or delete the cell CL, which is included in the frames DAa, DAb of the color palette CP in the parameter display screen WI2, by tapping the cell CL to be added or deleted on the parameter display screen WI2, for example. In this way, the user can adjust the ranges of the frames DAa, DAb in the color palette CP. That is, the user can input an adjustment instruction for adjusting the ranges of the values of the pixels specified by using the correction parameter, through the parameter display screen WI2. The CPU 210 adjusts the correction parameter, for example, based on the adjustment instruction of the user. As a result, since it is possible to finely adjust the automatically generated correction parameter based on the user's instruction, it is possible to determine the appropriate correction parameter without placing excessive burden on the user.

In S70, the CPU 210 determines whether the registration instruction of the correction parameter is input through the parameter display screen WI2. For example, when the user presses the registration button BT3, it is determined that the registration instruction is input, and when the user presses the cancel button BT4, it is determined that the registration instruction is not input.

When the registration instruction is input (S70: YES), in S80, the CPU 210 registers the correction parameter in the non-volatile storage device 220 in association with the registration name input in the field F1 upon the input of the registration instruction and terminates the parameter registration processing. The correction parameter to be registered is the correction parameter based Oil the frames DAa, DAb arranged in the color palette CP upon the input of the registration instruction, i.e., the information indicative of the one or more registration blocks corresponding to the one or more cells CL in the frames DAa, DAb. When the registration instruction is not input (S70: NO), the CPU 210 skips over S80 and terminates the parameter registration processing.

The parameter registration processing can be executed several times by changing the combination of the first original image data and the first corrected image data into a combination of two other image data, for example, based on the execution instruction of the user. In this case, the correction parameter is determined and registered for each of combinations of a plurality of sets. For example, the plurality of correction parameters may be registered for each of a plurality of ledger sheets to be issued from a plurality of business partners.

A-4. Second Color Drop Processing:

Subsequently, the second color drop processing that is executed by the CPU 210 of the second multifunction device 200 after the registration of the correction parameter is described. The second color drop processing is executed by using the correction parameter registered in the parameter registration processing, based on a start instruction of the user. The user's instruction is input through a UI screen (not shown) and includes a start instruction of the second color drop processing and an instruction of designating the scan data, which is a processing target.

Figure 10:
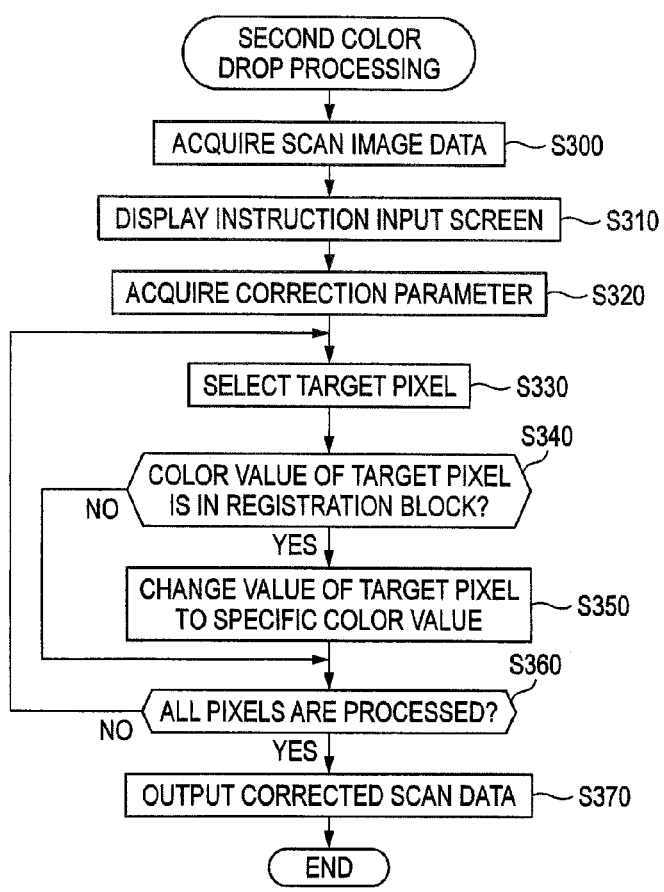
FIG. 10 is a flowchart of second color drop processing.

FIG. 10 is a flowchart of the second color drop processing. In S300, based on a designation instruction of the user, the CPU 210 acquires the scan data of the processing target designated by the user. For example, the scan data of the processing target is acquired from the one or more scan data, which is generated in advance by reading a document with the scanner unit 250 and stored in the non-volatile storage device 220, and is then stored in the buffer area 231. Instead, the CPU 210 may acquire the scan data of the processing target by reading a document with using the scanner unit 250 and then generating the scan data of the processing target, based on a scan instruction from the user.

The scan data of the processing target acquired in this step is the second type of scan data indicative of the color of each pixel by the second type of RGB value. The scan data of the processing target acquired in this step is also referred to as second original image data, and a scan image represented by the second original image data is also referred to as a second original image.

Figure 11A:
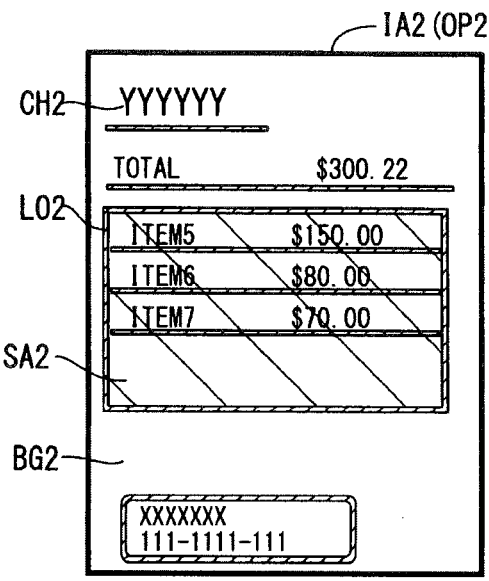
FIGS. 11A and 11B illustrate examples of a second original image and a second corrected image.
Figure 11B:
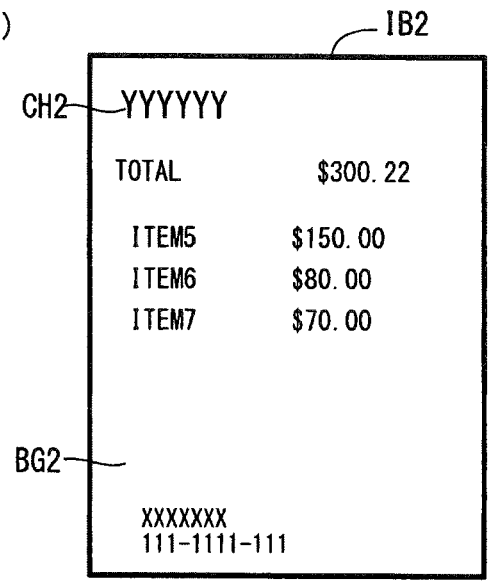

FIGS. 11A and 11b illustrate examples of the second original image and the second corrected image. The second original image data representing a second original image IA2 of FIG. 11A is generated by reading a ledger sheet OP2, which is the same type as the first original image IA1 of FIG. 2A, by the scanner unit 250. The second original image IA2 includes a plurality of characters CH2, an object LO2 such as a frame border and an underline except for the characters, an area SA2 of a solid color having a specific color except for white, and a white background BG2.

In S310, the CPU 210 displays an instruction input screen WI4 for inputting a setting relating to the second color drop processing on the display unit 270.

Figure 12:
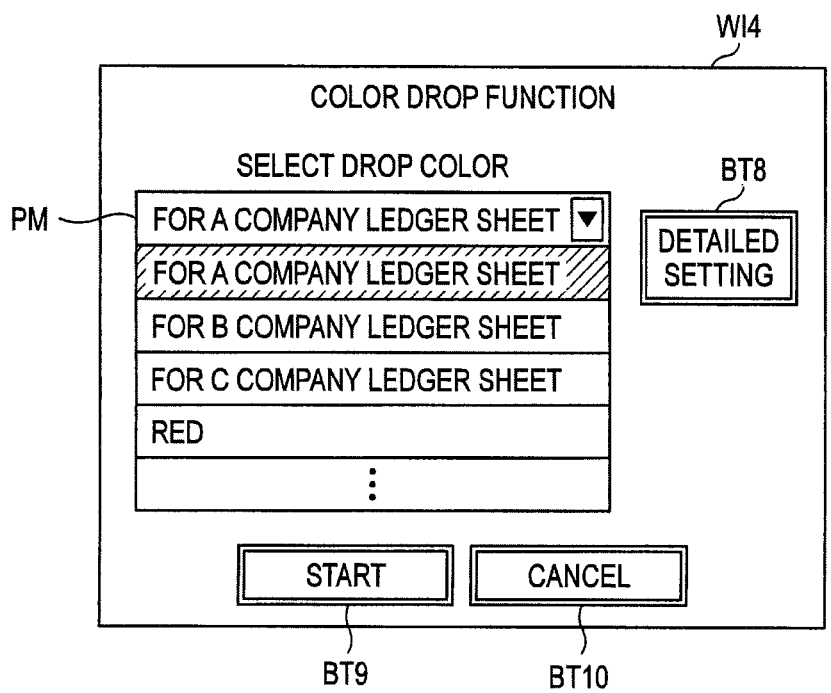
FIG. 12 illustrates an example of an instruction input screen WI4.

FIG. 12 illustrates an example of the instruction input screen WI4. The instruction input screen WI4 of FIG. 12 includes a pull-down menu PM and buttons BT8 to BT10. The pull-down menu PM is an input element for inputting a selection instruction to select one correction parameter, which is used when executing the second color drop processing, from the plurality of correction parameters.

Each of a plurality of items that can be selected from the pull-down menu PM indicates a registration name associated with the corresponding correction parameter. The user can easily input the selection instruction of one correction parameter by selecting one registration name from the pull-down menu PM. The plurality of selectable correction parameters including the N correction parameters are registered by executing N times (N: an integer of 2 or greater) the parameter registration processing of FIG. 3. In the N times parameter registration processing, the combinations of N sets of the first original image data and the first corrected image data are used. Each of the combinations of N sets is a combination of one image data of N different first original image data and one first corrected image data corresponding to the one image data. Also, the plurality of selectable correction parameters may include one or more default correction parameters registered in advance.

When the detailed setting button BT8 is pressed, the CPU 210 displays the parameter display screen WI2 of FIG. 9 on the display unit 270. At this time, in the color palette CP of the parameter display screen WI2, the frames DAa, DAb, which are indicative of the ranges of the drop colors indicated by the correction parameter selected from the pull-down menu PM of the instruction input screen WI4 displayed just previously, are arranged. The user can adjust the ranges of the frames DAa, DAb in the color palette CP in the parameter display screen WI2. In the field F1, a registration name of the correction parameter selected from the pull-down menu PM of the instruction input screen WI4 displayed just previously is displayed. The user can change the registration name in the field F1. As a result, the CPU 210 can register the correction parameter and adjust the correction parameter based on the user's instruction, not only upon the execution of the parameter registration processing but also upon the execution of the second color drop processing.

When the user presses the registration button BT3 and inputs the registration instruction, the CPU 210 registers the correction parameter based on the frames DAa, DAb arranged in the color palette CP at that point of time. When the registration name in the field F1 is not changed, the correction parameter of the registration name is updated, and when the registration name in the field F1 is changed, the correction parameter of the registration name is newly registered. When the user presses the cancel button BT4, the CPU 210 does not register the correction parameter. In the meantime, when any of the registration buttons BT3, BT4 is pressed, the CPU 210 again displays the instruction input screen WI4 of FIG. 12 on the display unit 270.

When a start button BT9 on the instruction input screen WI4 is pressed, the CPU 210 proceeds to S320. When a cancel button BT10 on the instruction input screen WI4 is pressed, the CPU 210 terminates the second color drop processing.

In S320, the CPU 210 acquires the correction parameter selected from the pull-down menu PM upon the pressing of the start button BT9 from the non-volatile storage device 220. That is, one correction parameter selected based on the selection instruction input from the user through the pull-down menu PM is acquired. As a result, the CPU 210 can execute the second color drop processing by using the appropriate correction parameter according to the user's intention. As described above, the correction parameter is the information indicative of one or more registration blocks of the plurality of blocks Bk set in the RGB color space CSP.

In S330, the CPU 210 selects one target pixel from the plurality of pixels in the second original image IA2. In S340, the CPU 210 determines whether the color value (the second type of RGB value) of the target pixel is included in any one of the one or more registration blocks, which are indicated by the correction parameters, in the RGB color space CSP.

When the color value of the target pixel is included in any one of the registration blocks (S340: YES), the CPU 210 changes the color value of the target pixel to a specific color value. In this illustrative embodiment, the specific color value is the second type of RGB value indicative of the white, i.e., the second type of RGB value of (R, G, B)=(255, 255, 255).

When the color value of the target pixel is not included in any one of the registration blocks (S340: NO), the CPU 210 skips over S430. Therefore, in this case, the color value of the target pixel is kept as the original value.

In S360, the CPU 210 determines whether all the pixels in the second original image IA2 have been processed as the target pixel. When there is a non-processed pixel (step S360: NO), the CPU 210 returns to step S330 and selects the non-processed image as a new target pixel. When all the pixels in the second original image IA2 have been processed (step S360: YES), the CPU 210 proceeds to S370. At this point of time, the corrected scan data is generated. The generated corrected scan data is also referred to as second corrected image data, and an image represented by the second corrected image data is also referred to as a second corrected image IB2.

FIG. 11B illustrates an example of the second corrected image IB2. Similarly to the first corrected image IB1 of FIG. 2B, the second corrected image IB2 includes the plurality of characters CH2 and does not include the object LO2 except for the characters and the area SA2 of the solid coating. Since the color values of the pixels configuring the object LO2 except for the characters and the area SA2 of the solid color have been changed to the color value indicative of the color of the background BG2 by the second color drop processing, the object LO2 except for the characters and the area SA2 of the solid color have been deleted.

In S370, the CPU 210 outputs the second corrected image data. Specifically, the CPU 210 outputs the second corrected image data to the non-volatile storage device 220 and stores the second corrected image data in the non-volatile storage device 220. Instead, the output of the second corrected image data may also be made by transmitting the second corrected image data to the user's terminal, or controlling the printer unit 240 to print the second corrected image IB2 by using the second corrected image data.

According to the above illustrative embodiment, in the parameter registration processing of FIG. 3, the CPU 110 calculates the decrement ΔD, which is a feature amount indicating the difference between the first original image data and the first corrected image data, by using the first original image data acquired in S10 and the first corrected image data acquired in S30 (S20 and S40 of FIG. 3, S110 of FIG. 5). The CPU 110 determines the correction parameter by using the calculated feature amount (in this illustrative embodiment, the decrement ΔD). Specifically, the correction parameter is the information indicating the one or more registration blocks, and the corresponding registration block is determined by using the decrement ΔD (S110 to S115 of FIG. 5). As shown in FIG. 10, the CPU 110 executes the second color drop processing for the second original image data, which is generated by optically reading the document OP2 different from the document OP1, thereby generating the second corrected image data. The second color drop processing is processing of changing the pixel value, which is indicative of the specific color specified by using the correction parameter (specifically, the information indicating the one or more registration blocks) determined in the parameter registration processing of FIG. 3, to the pixel value indicative of the color (in this illustrative embodiment, the white) different from the specific color (S320 to S360 of FIG. 10). As a result, it is possible to easily execute the second color drop processing for the second original image data. For example, even when there is no user's instruction to designate the specific color, it is possible to execute the second color drop processing for the second original image data.

More specifically, it may be not easy for the user to manually set, on the UI screen, the correction parameter of the second color drop processing to be executed at the second multifunction device 200 so that the same processing result as the first color drop processing executed at the first multifunction device 100 can be obtained. For example, when the range of the specific color to be changed is excessively narrow, there is a possibility that the object LO2 except for the characters and the area SA2 of the solid color may remain in the second corrected image IB2. Meanwhile, when the range of the specific color to be changed is excessively wide, there is a possibility that the characters may be removed from the second corrected image IB2. For this reason, it may be not easy that it is easy to appropriately determine the range of the specific color to be changed. In particular, in a case where the different correction parameters should be respectively prepared for the plurality of types of ledger sheets, for example, the ledger sheets of the plurality of business partners, it may be necessary to set the plurality of correction parameters, so that the user's burden increases. In this illustrative embodiment, since it is possible to automatically determine the correction parameter by using the feature amount indicating the difference between the first original image data and the first corrected image data generated by the first multifunction device 100, it is possible to easily execute the appropriate second color drop processing for the second original image data. Therefore, it is possible to reduce the user's burden to set the correction parameter at the second multifunction device 200.

Further, specifically, based on the decrement ΔD indicating the difference between the histogram of the first original image IA1 and the histogram of the first corrected image IB1, the block Bk of which a difference of the distribution number of pixels between the first original image data and the first corrected image data is larger than the reference value is determined as the registration block (S110 to S115 of FIG. 5). Then, the range of the color value defined by the block Bk is determined as the correction parameter indicative of the specific color, which is to be changed in the second color drop processing (S160). As a result, it is possible to appropriately determine the difference between the first original image IA1 and the first corrected image IB1, and it is possible to determine the correction parameter, which appropriately indicates the range of the specific color to be changed.

Further, in addition to the block Bk determined as the registration block in S110 to S115, the adjacent blocks BKa adjacent to the block Bk are additionally determined as the registration blocks, irrespective of the distribution number of pixels in the adjacent blocks BKa, i.e., irrespective of the value of the decrement ΔD (S135 to S145). As a result, it is possible to appropriately widen the range of the specific color to be changed. Therefore, it is possible to suppress the color to be changed from not being changed by the second color drop processing. That is, it is possible to suppress the object LO2 except for the characters and the area SA2 of the solid color from partially remaining in the second corrected image IB2 of FIG. 11B.

Also, in this illustrative embodiment, the first corrected image data is generated when the first color drop processing is executed by the first multifunction device 100. As a result, it is possible to easily execute the second color drop processing based on the first color drop processing, which is executed at the first multifunction device 100. In this illustrative embodiment, it is possible to easily execute the second color drop processing by which the processing result equivalent to the first color drop processing is obtained, at the second multifunction device 200. Therefore, for example, when switching the image processing apparatus configured to execute the color drop processing from the first multifunction device 100 to the second multifunction device 200, it is possible to reduce the user's burden upon the switching.

Also, the first original image data is generated by using the first multifunction device 100 serving as the first reading apparatus, and the second original image data is generated by using the second multifunction device 200 serving as the second reading apparatus. As a result, it is possible to easily execute the second color drop processing based on the first color drop processing, which is executed by the first multifunction device 100 for the first original image data generated by using the first multifunction device 100, for the second original image data generated by using the second multifunction device 200. For example, it is possible to easily accomplish the processing result, which is equivalent to the processing result obtained when the document is read and corrected by using the first multifunction device 100, by the second multifunction device 200.

Also, according to this illustrative embodiment, in the color matching processing of FIG. 7, the CPU 110 modify the registration block by using the ICC profile PF1. That is, the correction parameter is determined with using the ICC profile PF1. As a result, it is possible to generate the correction parameter, taking into consideration the characteristics of the scanner unit 150 of the first multifunction device 100, and thus it is possible to generate the appropriate correction parameter for the second color drop processing.

Further, in the color matching processing of FIG. 7, when the ICC profile PF1 cannot be acquired (S220: NO), the CPU 210 displays the notification screen WI1 to notify the user that the ICC profile PF1 cannot be acquired (S230). In many cases, the user may not know the ICC profile PF1. However, according to the notification, the user may operate to acquire the ICC profile PF1 from the first multifunction device 100 or the server that is managed by the manufacturer of the first multifunction device 100, for example.

Further, in the color matching processing of FIG. 7, the correction parameter is determined with using the ICC profile PF2, in addition to the ICC profile PF1. As a result, it is possible to generate the more appropriate correction parameter, taking into consideration the characteristics of the scanner unit 150 of the first multifunction device 100 and the characteristics of the scanner unit 250 of the second multifunction device 200. For example, even when the reading characteristics of the image sensors of the scanner unit 150 and the scanner unit 250 are largely different, the second color drop processing that is executed at the second multifunction device 200 can reproduce the first color drop processing executed at the first multifunction device 100 with high precision.

B. Second Illustrative Embodiment

B-1. Profile Generation Processing

In a second illustrative embodiment, profile generation processing is executed before the parameter registration processing of FIG. 3. In the profile generation processing, a profile PF3 is generated by using a patch sheet PS. In the profile PF3, the first type of RGB value, which is the pixel value of the first type of scan data such as the first original image data and the first corrected image data, and the second type of RGB value, which is the pixel value of the second type of scan data such as the second original image data and the second corrected image data, are associated with each other. In the second illustrative embodiment, instead of the ICC profile PF1 and the ICC profile PF2, the profile PF3 generated in the profile generation processing is used.

Figure 13:
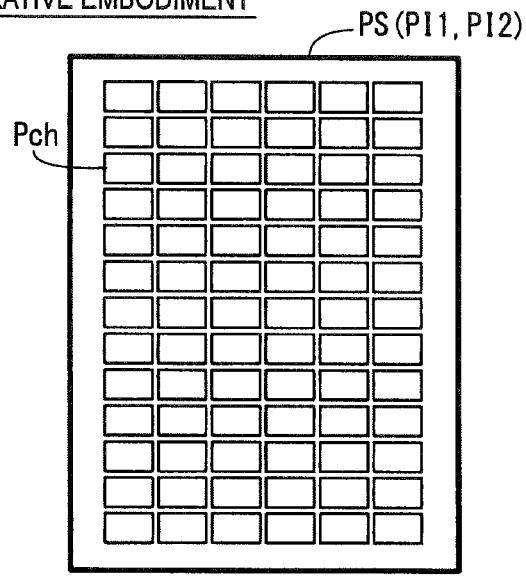
FIG. 13 illustrates an example of a patch sheet PS.

FIG. 13 illustrates an example of the patch sheet PS. The patch sheet PS includes a plurality of patches Pch. The patch Pch is a rectangular image of a single color. In this illustrative embodiment, the number of patches Pch is the same as the number of blocks Bk set in the RGB color space CSP. A plurality of patch sheets PS is also possible. Each patch image has a color indicative of the representative color value of the corresponding block of the blocks Bk set in the RGB color space CSP. For example, the color of each patch image is a color of the Lab value obtained by converting the representative color value (the second type of RGB value) of the block by the ICC profile PF2. The patch sheet PS is provided by the manufacturer of the second multifunction device 200, for example.

Figure 14:
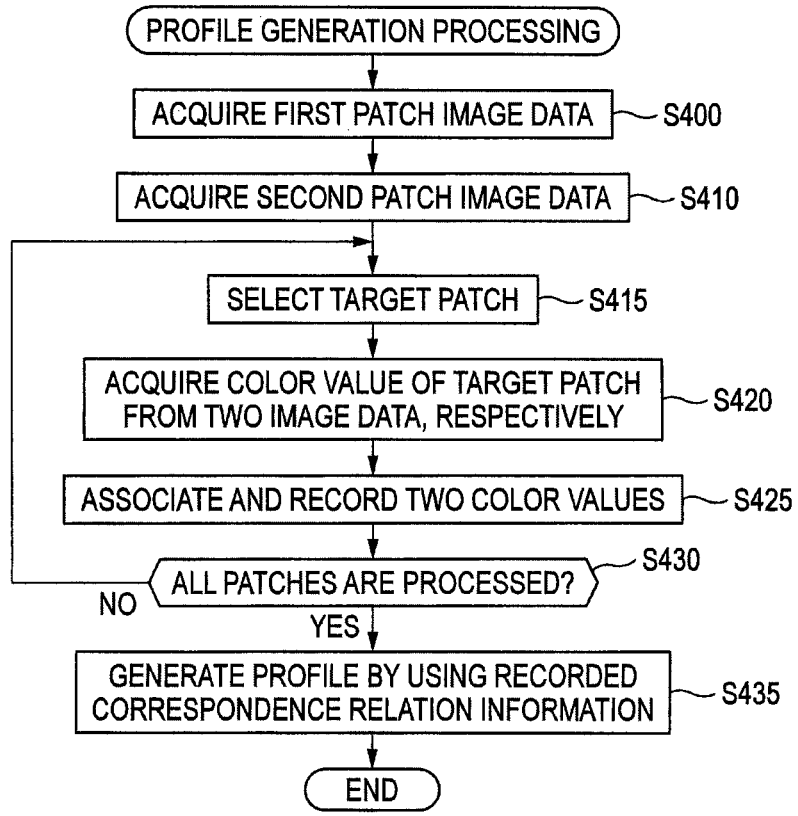
FIG. 14 is a flowchart of profile generation processing.

FIG. 14 is a flowchart of the profile generation processing. In S400, the CPU 210 acquires first patch image data. The first patch image data is generated when the patch sheet PS is read using the scanner unit 150 of the first multifunction device 100. Therefore, the first patch image data is image data that is represented by the first type of RGB value depending on the scanner unit 150. For example, the user enables the first multifunction device 100 to generate the first patch image data and connects the removable memory having the first patch image data stored therein to the communication unit 280. The CPU 210 acquires the first patch image data from the removable memory.

In S410, the CPU 210 acquires second patch image data. For example, the CPU 210 reads the patch sheet PS to generate second patch image data by the scanner unit 250, thereby acquiring the second patch image data. The second patch image data is image data that is represented by the second type of RGB value depending on the scanner unit 250.

It can be said that FIG. 13 illustrates a first patch image PI1 represented by the first patch image data and a second patch image PI2 represented by the second patch image data.

In S415, the CPU 210 selects one target patch from the plurality of patches Pch in the second patch image PI2. In S420, the CPU 210 acquires a color value of the target patch in the second patch image PI2 from the second patch image data, and also acquires a color value of the patch (hereinafter, also referred to as a correspondence patch) in the first patch image PI1 corresponding to the target patch from the first patch image data. The correspondence patch is a patch in the first patch image PI1 located at the same position as the target patch in the second patch image PI2. In other words, the target patch and the correspondence patch are images obtained by reading the same patch Pch of the patch sheet PS. Since the patch sheet PS is provided by the manufacturer of the second multifunction device 200, the CPU 210 recognizes in advance the positions of the patch in the patch image PI1, PI2. As the color value of the target patch, an average value of the values of the pixels in the target patch of the second patch image PI2 is used, for example. As the color value of the correspondence patch, an average value of the values of the pixels in the correspondence patch of the first patch image PI1 is used, for example.

In S425, the CPU 210 associates the color value of the target patch and the color value of the correspondence patch and records the same in the buffer area 231. Since the color value of the target patch is the second type of RGB value and the color value of the correspondence patch is the first type of RGB value, it is possible to acquire a correspondence relation between the first type of RGB value and the second type of RGB value for one block Bk in S425.

In S430, the CPU 210 determines whether all the patches Pch in the second patch image PI2 have been processed as the target patch. When there is a non-processed patch Pch (step S430: NO), the CPU 210 returns to step S415 and selects the non-processed patch Pch as a new target patch. When all the patches Pch have been processed (step S430: YES), the CPU 210 proceeds to S435. At this point of time, the correspondence relations between the first type of RGB value and the second type of RGB value are acquired for all the blocks Bk.

In S435, the CPU 210 generates the profile PF3, in which the correspondence relations between the first type of RGB value and the second type of RGB value are defined for all the blocks Bk in the RGB color space CSP, and stores the same in the non-volatile storage device 220.

Figure 15:
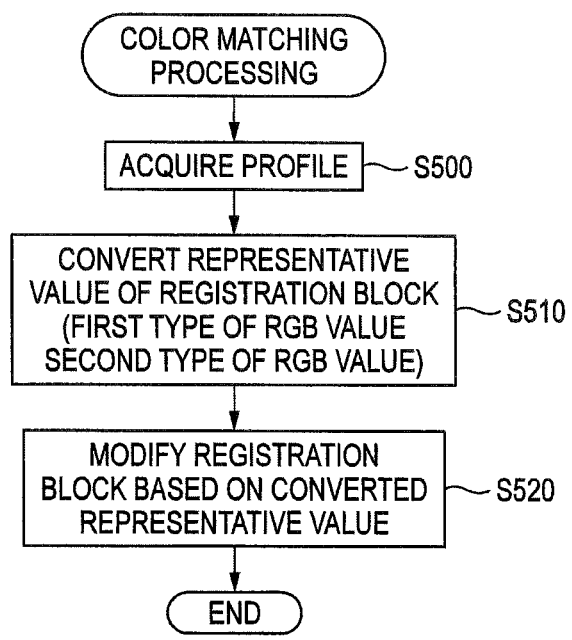
FIG. 15 is a flowchart of the color matching processing according to a second illustrative embodiment.

B-2. Color Matching Processing:

In the second illustrative embodiment, in S155 of FIG. 5, the color matching processing using the profile PF3 is executed, instead of the color matching processing of FIG. 7. FIG. 15 is a flowchart of the color matching processing according to the second illustrative embodiment. In S500, the CPU 210 acquires the profile PF3 generated in the profile generation processing of FIG. 14 from the non-volatile storage device 220 and stores the same in the buffer area 231.

In S510, the CPU 210 converts the representative color value of each of the plurality of registration blocks recorded in the processing of S100 to S150 of FIG. 5 from the first type of RGB value to the second type of RGB value by using the profile PF3.

In S520, like S280 of FIG. 7, the CPU 210 modifies the registration block based on the converted representative color value and terminates the color matching processing.

According to the second illustrative embodiment, in the profile generation processing of FIG. 14, the profile PF3 is generated by using the first patch image data and the second patch image data. Thereby, the profile PF3 in which the first type of RGB value and the second type of RGB value are associated is acquired. As shown in FIG. 15, the correction parameter is determined with using the profile PF3. As a result, for example, even when the ICC profile PF1 cannot be acquired, it is possible to generate the appropriate correction parameter, taking into consideration the characteristics of the scanner unit 150 and the scanner unit 250.

B. Modified Embodiments (1) In the respective illustrative embodiments, the reading apparatus configured to generate the first original image data and the apparatus configured to execute the first color drop processing for the first original image data are the same apparatus (i.e., the first multifunction device 100), but may be different apparatuses. For example, the first original image data generated by the first multifunction device 100 may be transmitted to the user's terminal (for example, a PC and a smart phone) and a CPU of the terminal may execute the first color drop processing. In this case, for example, the first original image data and the first corrected image data may be transmitted from the terminal to the second multifunction device 200 through the communication unit 180 and may be thus acquired by the second multifunction device 200.

(2) In the respective illustrative embodiments, the reading apparatus configured to generate the second original image data and the apparatus configured to execute the second color drop processing for the second original image data are the same apparatus (i.e., the second multifunction device 200), but may be different apparatuses. For example, the second original image data generated by the second multifunction device 200 may be transmitted to the user's terminal and a CPU of the terminal may execute the second color drop processing. In this case, the CPU of the terminal may acquire the first original image data and the first corrected image data from the first multifunction device 100, execute the parameter registration processing, acquire the second original image data from the second multifunction device 200, and execute the second color drop processing.

(3) In the respective illustrative embodiments, the reading apparatus (i.e., the first multifunction device 100) configured to generate the first original image data and the reading apparatus (i.e., the second multifunction device 200) configured to generate the second original image data are different, but may be the same. For example, the first original image data may be generated at the second multifunction device 200 and supplied to the user's terminal, and the CPU of the terminal may execute the first color drop processing. In this case, the CPU 210 may be configured to execute the parameter registration processing so that the CPU 210 of the second multifunction device 200 can execute the same second color drop processing as the first color drop processing for the second original image data generated at the second multifunction device 200. In this case, the color matching processing may not be executed and the profiles PF1 to PH may not also be acquired.

(4) In the respective illustrative embodiments, the apparatus (i.e., the first multifunction device 100) configured to execute the first color drop processing and the apparatus (i.e., the second multifunction device 200) configured to execute the second color drop processing are different, but may be the same apparatus. For example, it is assumed that the setting of the correction parameter of the first color drop processing, which was executed for the previously generated first original image data at the second multifunction device 200, is deleted. In this case, the CPU 210 may be configured to execute the parameter registration processing so that the CPU 210 of the second multifunction device 200 can execute the same second color drop processing as the previously executed first color drop processing for the second original image data.

(5) In the color matching processing of the first illustrative embodiment, the correction parameter is determined with using the ICC profile PF1 and the ICC profile PF2. However, the correction parameter may be determined with using the ICC profile PF1 without using the ICC profile PF2. In this case, for example, the correction parameter, which is determined with the first type of RGB value, is converted into the Lab value by using the ICC profile PF1, so that a parameter defining the range of the color value of the specific color in the CIELAB color space is determined. The CPU 210 may be configured to convert the second original image data into the image data, which is indicative of the color of each pixel with the Lab value, by using the ICC profile PF2, and to execute the second color drop processing for the converted image data by using the correction parameter.

(6) In the respective illustrative embodiments, the correction parameter is the information indicative of the one or more registration blocks. However, the disclosure is not limited thereto inasmuch as the information can specify the range of the color value indicating the specific color. For example, the information indicative of a central color value and a radius may be used as the correction parameter indicative of a spherical range in the specific color space.

(7) In the second illustrative embodiment, the patch sheet PS is read using the first multifunction device 100, so that the first patch image data serving as the first reference image data is generated, and the patch sheet PS is read using the second multifunction device 200, so that the second patch image data serving as the second reference image data is generated. Instead, the first original image data, which is generated by reading the document OP1 of FIG. 2A with the first multifunction device 100, may be used as the first reference image data. In this case, the same document OP1 is read using the second multifunction device 200, so that the second reference image data is generated. The CPU 210 may also be configured to generate the profile PF3 by using the first reference image data and the second reference image data. For example, the CPU 210 may extract the pixels, which configure the object LO1 except for the characters and the area SA1 of the solid color in the document OP1, from the two reference image data, respectively, and associate the color values indicative of the colors of the extracted pixels to generate the profile PF3.

(8) In the first illustrative embodiment, the correction parameter is generated by using the histogram of the first original image IA1 and the histogram of the first corrected image IB1. Instead, the correction parameter may also be generated by the other methods. For example, the first original image IA1 and the first corrected image IB1 may be respectively divided into a grid shape, and a plurality of divided areas may be set in the two images IA1, IB1, respectively. Then, differences of the divided areas of the two images IA1, IB1, which correspond to each other, are extracted, and areas having a large difference are specified. Then, a color value, which is included in the specified divided area of the first original image IA1 and is not included in the corresponding divided area of the first corrected image IB1, is specified as the color value indicating the specific color to be changed, and a correction paramete indicative of the range including the specified color value is determined.

(9) In the illustrative embodiments, the first original image data and the second original image data are the scan data generated by the scanner units 150, 250. The disclosure is not limited thereto, and a variety of image data representing the optically read image may be used. For example, the image data, which is generated when a document is optically read by the photographing of a digital camera, may be adopted.

(10) in the respective illustrative embodiments, a part of the configurations that are implemented by the hardware may be replaced with the software. Also, a part or all of the configurations that are implemented by the software may be replaced with the hardware.

Although the disclosure has been described based on the illustrative embodiments and the modified embodiments, the illustrative embodiments are provided only to easily understand the disclosure, not to limit the disclosure. The disclosure can be changed and improved without departing from the gist and scope of the disclosure and includes the equivalents thereto.

What is claimed is:

1. An image processing apparatus comprising a controller configured to perform: acquiring first original image data generated by optically reading a first document;
  acquiring first corrected image data generated by executing first correction processing for the first original image data, wherein the first correction processing is processing of changing a pixel value indicative of a specific color into a pixel value indicative of a color different from the specific color;
  calculating a feature amount indicative of a difference between the first original image data and the first corrected image data by using the first original image data and the first corrected image data;
  determining a correction parameter indicative of the specific color by using the calculated feature amount;
  acquiring second original image data generated by optically reading a second document different from the first document; and
  generating second corrected image data by executing second correction processing for the second original image data, wherein the second correction processing is processing of changing the pixel value indicative of the specific color specified by using the determined correction parameter into the pixel value indicative of the color different from the specific color,
  wherein, to perform the calculating, the controller is further configured to perform:
  generating an original image histogram indicative of a distribution of pixels in a specific color space with respect to the first original image data;
  generating a corrected image histogram indicative of a distribution of pixels in the specific color space with respect to the first corrected image data; and
  calculating, as the feature amount, a difference between the original image histogram and the corrected image histogram, and
  wherein, to perform the determining, the controller is further configured to perform:
  determining, based on the difference between the original image histogram and the corrected image histogram, a first color-value range in which a difference of numbers of distributed pixels between the first original image data and the first corrected image data is larger than a reference value; and
  determining, as the correction parameter indicative of the specific color, the first color-value range.

2. The image processing apparatus according to claim 1, wherein the first corrected image data is generated when the first correction processing is executed by other image processing apparatus.

3. The image processing apparatus according to claim 2, wherein the first original image data is generated by using a first reading apparatus and is acquired by the other image processing apparatus, and
  wherein the second original image data is generated by using a second reading apparatus different from the first reading apparatus and is acquired by the image processing apparatus.

4. The image processing apparatus according to claim 3, wherein the controller is further configured to perform:
  acquiring a first profile in which a color value of a first color space depending on the first reading apparatus and a color value of other color space are corresponded to each other,
  wherein the correction parameter is further determined by using the first profile.

5. The image processing apparatus according to claim 4,
wherein the controller is further configured to perform:
notifying, when the first profile cannot be acquired, a user that the first profile cannot be acquired.

6. The image processing apparatus to claim 3,
wherein the controller is further configured to perform
acquiring a second profile in which a color value of a second color space depending on the second reading apparatus and a color value of the other color space are corresponded to each other; and
wherein the correction parameter is further determined by using the first profile and the second profile.

7. The image processing apparatus according to claim 4,
wherein, to perform the acquiring of the first profile, the controller is further configured to perform:
acquiring first reference image data, which is generated by reading a specific document by using the first reading apparatus and is represented by the color value of the first color space depending on the first reading apparatus;
acquiring second reference image data, which is generated by reading the specific document by using the second reading apparatus and is represented by the color value of the second color space depending on the second reading apparatus; and
acquiring the first profile, in which the color value of the first color space and the color value of the second color space are corresponded with each other, by generating the first profile based on the first reference image data and the second reference image data.

8. The image processing apparatus according to claim 1,
wherein, to perform the determining, the controller is further configured to perform:
determining, as the correction parameter indicative of the specific color, a second color-value range adjacent to the first color-value range irrespective of the distribution number of pixels in the second color-value range.

9. The image processing apparatus according claim 1,
wherein the controller is further configured to perform:
controlling to display a parameter display screen, in which a range of the pixel value indicative of the specific color specified by using the determined correction parameter is displayed; and
adjusting the determined correction parameter, based on an adjustment instruction to be input through the parameter display screen.

10. The image processing apparatus according to 1,
wherein, to perform the determining, the controller is further configured to perform:
determining N correction parameters corresponding to combinations of N sets of the first original image data and the first corrected image data, N being 2 or more,
wherein each of the combinations of N sets is a combination of one image data of the first original image data and the one first corrected image data corresponding to the one image data and is different from each other,
wherein the controller is further configured to perform:
controlling to display an instruction input screen, in which a selection instruction is input to select one correction parameter from the N determined correction parameters, and
wherein, to perform the executing, the controller is further configured to perform:
executing the second correction processing for the second original image data by using the one correction parameter selected by the selection instruction.

11. A non-transitory computer-readable medium having instructions to control a computer to perform:
acquiring first original image data generated by optically reading a first document;
acquiring first corrected image data generated by executing first correction processing for the first original image data, wherein the first correction processing is processing of changing a pixel value indicative of a specific color into a pixel value indicative of a color different from the specific color;
calculating a feature amount indicative of a difference between the first original image data and the first corrected image data by using the first original image data and the first corrected image data;
determining a correction parameter indicative of the specific color by using the calculated feature amount;
acquiring second original image data generated by optically reading a second document different from the first document; and
generating second corrected image data by executing second correction processing for the second original image data, wherein the second correction processing is processing of changing the pixel value indicative of the specific color specified by using the determined correction parameter into the pixel value indicative of the color different from the specific color,
wherein, the calculating comprises:
generating an original image histogram indicative of a distribution of pixels in a specific color space with respect to the first original image data;
generating a corrected image histogram indicative of a distribution of pixels in the specific color space with respect to the first corrected image data; and
calculating, as the feature amount, a difference between the original image histogram and the corrected image histogram, and
wherein, the determining comprises:
determining, based on the difference between the original image histogram and the corrected image histogram, a first color-value range in which a difference of numbers of distributed pixels between the first original image data and the first corrected image data is larger than a reference value; and
determining, as the correction parameter indicative of the specific color, the first color-value range.

* * * * *